United States Patent
Feder et al.

(10) Patent No.: US 8,519,639 B2
(45) Date of Patent: Aug. 27, 2013

(54) SOLAR-POWERED LIGHTING SYSTEM

(76) Inventors: Michael Feder, San Diego, CA (US);
Eric D. Smith, San Diego, CA (US);
Amy S. Berman, San Diego, CA (US)

( * ) Notice: Subject to any disclaimer, the term of this patent is extended or adjusted under 35 U.S.C. 154(b) by 8 days.

(21) Appl. No.: 13/174,698

(22) Filed: Jun. 30, 2011

(65) Prior Publication Data

US 2012/0044672 A1   Feb. 23, 2012

Related U.S. Application Data

(63) Continuation-in-part of application No. 12/507,240, filed on Jul. 22, 2009, now Pat. No. 7,994,735.

(51) Int. Cl.
*H05B 37/02*   (2006.01)

(52) U.S. Cl.
USPC .................................. 315/297; 315/355

(58) Field of Classification Search
USPC .................. 315/160, 291, 297, 349, 354
See application file for complete search history.

*Primary Examiner* — Don Le
(74) *Attorney, Agent, or Firm* — Steven W. Webb

(57) ABSTRACT

An improved, solar-controlled light device with a circuit-control having a phototransistor, a variable resistor, and a first transistor connected to a storage unit, to a solar cell, and to a current-control. The variable resistor can be set to permit the device to turn on at pre-set ambient light levels. The current-control has a transformer, a second resistor, and a second transistor, connected at one end of the current-control to a light and at another end connected to the circuit-control, wherein the current-control senses the amount of power and boosts the power as needed to a sufficient level to power the lights.

1 Claim, 1 Drawing Sheet

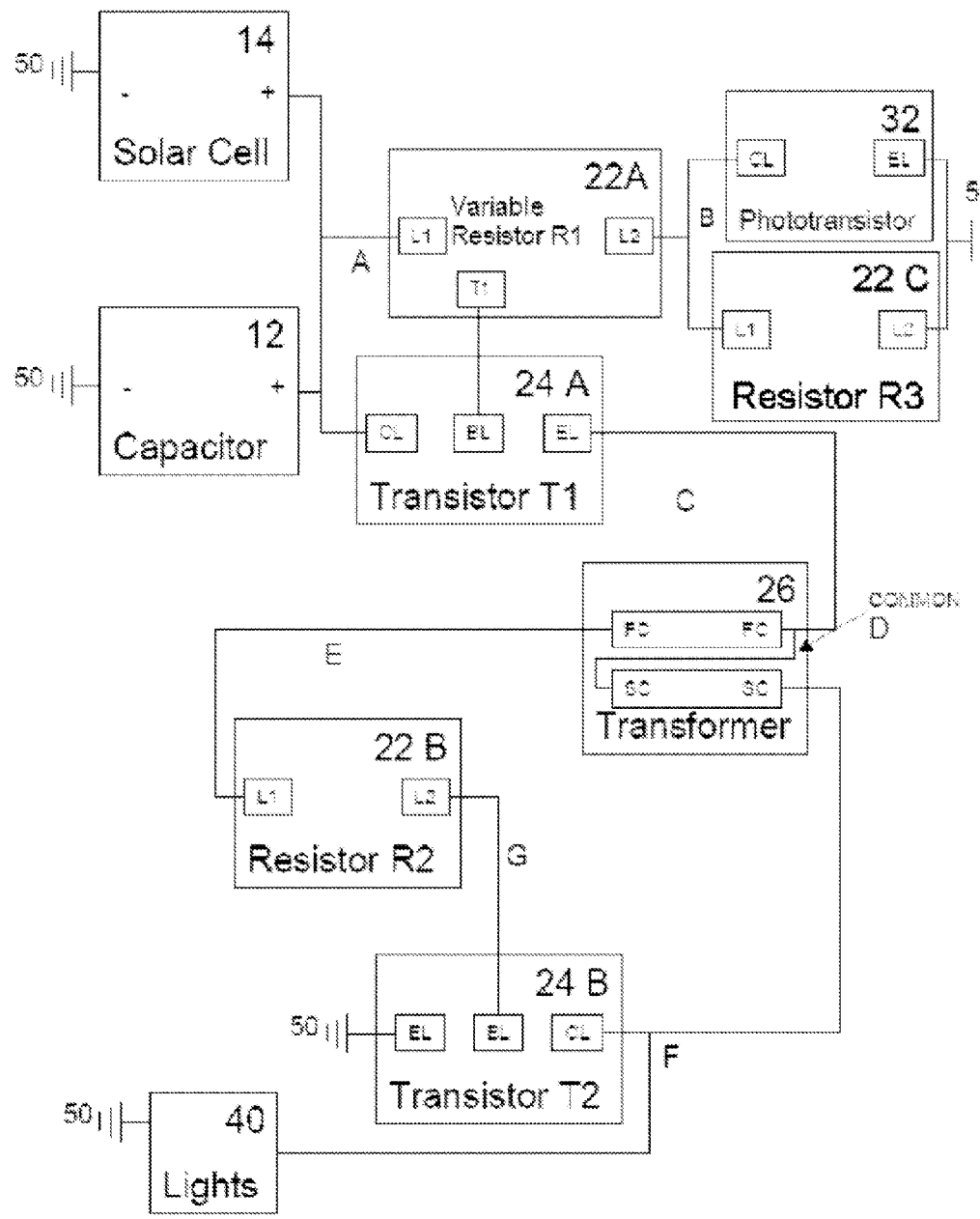

SOLAR-POWERED LIGHTING SYSTEM

CROSS REFERENCES TO RELATED APPLICATIONS

This is a Continuation-In-Part application of U.S. patent application Ser. No. 12/507,240 filed Jul. 22, 2009 now U.S. Pat. No. 7,994,735.

FIELD OF THE INVENTION

This invention relates to the field of solar-powered devices, specifically solar-powered lighting.

BACKGROUND

The device of the present disclosure relates to an improvement in self-sustaining lighting devices utilizing solar power. There is a need for such devices to provide lighting.

State of the art lighting devices lack the simplicity of the present device, including the ability to detect current flow and boost that flow when and as necessary, and they lack the present invention's unique double-coiled transformer, as shown herein, that functions in the capacity of a sensor and booster component in the present configuration. The present device also possesses unique on/off switching capability with an additional variable resistor to set the amount of ambient light that triggers the emitted light source. If the variable resistor is set all the way to "off", the device will only charge the storage device, whereas if the variable resistor is set all the way to "on", the device will force itself to activate the lights.

This unique lighting device is easy and inexpensive to manufacture, easy and inexpensive to operate, and more importantly, easy and inexpensive to maintain.

The foregoing has outlined some of the more pertinent objects of the lighting device. These objects should be construed to be merely illustrative of some of the more prominent features and applications of the lighting device. Many other beneficial results can be attained by applying the disclosed lighting device in a different manner or by modifying the lighting device within the scope of the disclosure. Accordingly, other objects and a fuller understanding of the lighting device may be had by referring to the summary of the lighting device and the detailed description of the preferred embodiment in addition to the scope of the lighting device defined by the claims taken in conjunction with the accompanying drawings.

SUMMARY OF THE INVENTION

The present invention is a solar-controlled light device having a solar cell, a power storage means, a circuit-control means for placing the device into an open mode by opening the flow of energy, a current-control means for sensing and controlling the flow of energy, and a light to be powered on at darkness and to be powered off with ambient light, unless overridden by the variable resistor. The circuit-control means has a phototransistor, a first resistor, a variable resistor, and a first transistor connected to the power storage unit, to the solar cell, and to the current-control means.

The current-control has a transformer, a second resistor, and a second transistor, wherein the current-control means is connected at one end to the light and the other end of the current-control means is connected to the circuit-control. The current-control is adapted to sense the amount of electrical power flowing in the open mode and to boost the electrical power as needed to a sufficient level to power the lights.

BRIEF DESCRIPTION OF THE DRAWINGS

FIG. 1. Block diagram of the preferred embodiment.

DETAILED DESCRIPTION

The lighting system and unique device of this disclosure basically comprises one or more of the following conventionally available components: a solar cell, a capacitor, a resistor, a variable resistor, a transistor, a transformer, a phototransistor, and a lighting component. Typical components, or their equivalent, for this system and specific lighting device and their specifications, could include (refer to FIG. 1):

1. A NessCap capacitor, Model PSHLR-0050C0-002R3, of about 2.3V and storage potential of about 50 Farad, or equivalent
2. Any generic solar cell 14 of approximately 2.2 v and 112 mA. The solar cell 14 should have a voltage rating approximately equivalent to that of the capacitor 12.
3. Any generic resistor 22C, of about 3.3 kilo ohm at ⅛ Watt with a tolerance of about 5%, or equivalent.
4. Any two generic NPN-type switching transistors, 24A and 24B, having a power dissipation of about 350 mW and I(C) Max. of 200 mA as the maximum current for this lighting device.
5. A Siemens®, infrared NPN phototransistor 32, Model BPX81, or equivalent.
6. A Laird Technology®, transformer 26 with a ferrite core, Model 35T0231-00P, or equivalent. This is important as the transformer serves as the current-control mechanism by sensing the voltage, regulating it, and boosting it as necessary to power the lights.
7. Lite-On® brand white super-bright LED lights 40, Model LAW-420D7, of about 3.3V with current of about 30 mA, and power dissipation of about 120 mW.
8. A variable resistor 22A that is center-tapped and 10 K Ohm.
9. Any generic resistor 22B, of about 1 kilo ohm at ⅛ Watt with a tolerance of about 5%, or equivalent.

As configured in this disclosure and in operation, the lighting device becomes a self-contained, self-generating lighting device which captures solar energy, converts the solar energy to electricity, and stores the electricity for use during darkness when ambient light is no longer detected. A simple solar cell is used to absorb the solar energy and convert it into electricity.

A super-capacitor is charged by the converted electricity and stores such for later use. When light is no longer detected by the phototransistor, based on the sensitivity setting imposed by the variable resistor 22A, the phototransistor will cease its operation and the switching transistor 24A will cause the circuit to close, allowing the capacitor to power the lights associated with the lighting device.

Based on the variable resistor 22A setting, the device can be entirely switched off so that no power flows to the lights 40, or a variable amount of power can be sent to the lights in a controlled manner.

Referring to FIG. 1, if the tap T1 of the variable resistor 22A is all the way towards L2, the resistance between L1 and T1 would be maximized to a point where no amount of light could activate the circuit, and the only thing that the circuit could do is charge. If the tap is in the middle, then the tap's relative location would dictate how dark it would have to be before the light activates. With the tap being closer to L1, the light would turn on when it is still bright. When the tap is closer to L2, it would have to be darker before the light activates.

Internal circuitry regulates the voltage and current streaming from the capacitor to provide a consistent and long-lasting light from the lighting device with minimal, if any, variations in luminescence as the capacitor discharges. The values of the transformer, lights, capacitor (power store) and variable resistor can be selected to maximize light duration, lumen output and storage time to meet performance requirements for the system.

The variable resistor 22A operates with the first switching transistor, 24A, and allows a minute portion of electricity to pass to 24A, the resistor R3, and the phototransistor, which comprises the control section of the circuit. The resistor R3 operates in conjunction with the first switching transistor, 24A, and the variable resistor, R1, and permits only a minute portion of the electricity to pass around the phototransistor. This allows the control circuit to be grounded at all times, thereby allowing it to be forced to remain off.

Refer to FIG. 1 to see a preferred embodiment of the configuration of the components and their connections, which are critical for the operation of the circuit and its control, the current and its control, and the voltage necessary to maintain this lighting system and device as operational.

The positive leads of the capacitor 12 and the solar cell 14 are connected to one another and to a first lead [L1] of the variable resistor [R1] 22A and to the collector lead [CL] of the first transistor [T1] 24A. By way of Line-B, the collector lead [CL] of the phototransistor 32 is connected to the second lead [L2] of the variable resistor [R1] 22A and to the first lead [L1] of resistor R3 22C. The tap T1 of the variable resistor 22A is connected directly to the base lead of the first transistor 24A. The negative output of the capacitor 12, solar cell 14, L@ of resistor [R3] 22C, and the emitter lead [EL] of the phototransistor 32 are connected to a common ground 50.

Line-C connects the emitter lead [EL] of the first transistor [T1] 24A to a common lead [Line-D] and to one end of the first coil [FC]. This configuration forces the capacitor 12 to store electrical power generated by the solar cell 14 and, in conjunction with the phototransistor 32 and the variable resistor 22A, enables transistor [T1] 24A to control whether and when power will flow from the capacitor 12 to the transformer 26.

This type of configuration also pulls the current flowing to the base lead [BL] of the first transistor [T1] 24A to positive and functions as the control to thereby activate the circuit and, if ambient light is detected, also pulls the current flowing to the base lead [BL] of transistor 24A to negative and deactivates that circuit. If, however, no ambient light is detected by, or exists, the phototransistor 32 will not activate.

Typically, when ambient light is sufficient, the phototransistor 32 will be active and prevent transistor [T1] 24A from activating by drawing current away from the base lead [BL] of the first transistor [T1] 24A, preventing the solar cell 14 and the capacitor 12 from powering the rest of the circuit. When this occurs, the solar cell 14 recharges the capacitor 12 via the connection depicted by Line-A. During darkness, the phototransistor 32 deactivates, allowing transistor [T1] 24A to activate, completing the circuit and providing power from the capacitor 12 to the rest of the circuit thereby allowing the rest of the circuit to activate.

The common lead of the transformer 26 [Line-D] also connects one lead of the transformer's coil [first coil (FC)] to the opposing lead of the transformer's second coil [SC]. This connection ensures that if current is flowing through the second coil [SC] of the transformer 26 it will create a magnetic field that will cancel out current flowing through the first coil [FC] of the transformer 26.

In this embodiment, the remaining lead of the first coil [FC] of the transformer 26 connects to a first lead [L1] of the second resistor [R2] 22B through Line-E and the second lead [L2] of the second resistor [R2] 22B connects to the base lead [BL] of the second transistor [T2] 24B through Line-G. As so configured, the first coil [FC] of the transformer 26, combined with the second resistor [R2] 22B and the second transistor [T2] 24B, act as a sensor to detect whether or not a sufficient amount of current is flowing through the second coil [SC] of the transformer 26 and if not, to "boost" the flow thereby increasing the voltage to an amount sufficient to power the lights 40.

The emitter lead [EL] of the second transistor [R2] 24B is connected to the common ground 50 and the remaining lead of the second coil [SC] of the transformer 26 is connected to the collector lead [CL] of the second transistor [T2] 24B and to the lighting array 40 through Line-F.

The lighting array 40 is also connected to the common ground 50. The second transistor [T2] 24B initiates the lighting operation by allowing current to flow freely through the second coil [SC] and to the ground 50; however, if sufficient current flows through the second coil [SC] of the transformer 26, the second transistor [T2] 24B deactivates and forces current to flow through the lighting array 40. In doing so, the second coil [SC] of the transformer 26 acts like a temporary battery in series with the capacitor 12 and thereby generates sufficient voltage to power the lights of the light array 40. If, however, the current flowing through the second coil [SC] cannot sustain this output, the current will drop triggering current to flow through the first coil [FC] of the transformer 26 which thereby causes the second transistor [T2] 24B to reactivate and start the cycle over again.

The second resistor [R2] 22B limits the amount of current flowing into the base lead [BL] of the second transistor [T2] 24B, therefore preventing the second transistor [T2] 24B from suffering damage as a result of current flowing from the first coil [FC] of the transformer 26.

Although this lighting device has been described in its preferred form with a certain degree of particularity, it is understood that the present disclosure of the preferred form has been made only by way of example and numerous changes in the details of construction and combination and arrangement of parts and method steps may be resorted to without departing from the spirit and scope of the lighting device. Accordingly, the scope of the lighting device should be determined not by the embodiment[s] illustrated, but by the appended claims and their legal equivalents.

Applicant[s] have attempted to disclose all the embodiment[s] of the lighting device that could be reasonably foreseen. It must be understood, however, that there may be unforeseeable insubstantial modifications to the present invention that remain as equivalents to it, and thereby fall within its scope.

What is claimed is:

1. A solar-controlled light device comprising:
   (a) a solar cell having a positive end and a negative end wherein said negative end is connected to a common ground;
   (b) power storage means for storing electrical energy received from said solar cell and for releasing said electrical energy, said power storage means having a positive end and a negative end wherein said positive end is connected to said positive end of said solar cell and said negative end is connected to said common ground;

(c) light source for receiving said electrical energy, said light source having a positive end and a negative end wherein said negative end is connected to said common ground;

(d) circuit-control means for controlling a circuit from said power storage means to said light source by selectively opening the circuit thereby placing the device into an open mode to power said light source and for closing said circuit and placing the device into a closed mode and terminating said circuit and power to said light source; and (e) current-control means for controlling rate of flow of said current when said circuit is in said open mode, sensing when said current is too low to power said light source, and boosting said circuit to a sufficient power level to power said light source when said power is too low, said current-control means comprised of a transformer having a first coil with a first end and a second end and a second coil having a first end and a second end wherein the first end of said first coil is connected the second end of said second coil by a common line;

a resistor-R2 having a first lead and a second lead wherein said first lead is connected to said second end of said first coil, and a transistor-T2 having a collector lead, a base lead, and an emitter lead wherein said collector lead is connected to said first end of said second coil and to said positive end of said light source, said base lead is connected to said second lead of said resistor-R2, and said emitter lead is connected to said common ground, said first coil and said second coil each comprised of wire of approximately similar gauge with approximately 20 turns therearound thereby bearing a winding turn-ratio of 1:1 and bearing an approximate inductance of about 300 UH per coil, said circuit-control means comprised of a phototransistor having a collector lead and an emitter lead wherein said emitter lead is connected to said common ground, a variable resistor R1 having a tap lead, first lead and a second lead wherein said tap lead is connected directly to the base lead of a transistor-T1, said first lead is connected to said solar cell and to said power storage means and said second lead is connected to said collector lead of said phototransistor, and a transistor, T1, possessing a collector lead, a base lead, and an emitter lead wherein said collector lead is connected to said solar cell and to said power storage means, said base lead is connected to said tap lead of said variable resistor, R1, and said emitter lead is connected to said common line.

\* \* \* \* \*